Oct. 19, 1948.   F. I. GOIN   2,451,616
AUTOMATIC STOP AND LOCK FOR MACHINES FOR GAUGING CARTRIDGES
Filed April 4, 1944   2 Sheets-Sheet 1

INVENTOR.
FLOYD I. GOIN
BY
Harold L. Gammons
AGENT

Oct. 19, 1948.　　　　　F. I. GOIN　　　　　2,451,616
AUTOMATIC STOP AND LOCK FOR MACHINES FOR GAUGING CARTRIDGES
Filed April 4, 1944　　　　　　　　　　　　　2 Sheets-Sheet 2

INVENTOR.
FLOYD I. GOIN
BY
Harold L. Gammons
AGENT

Patented Oct. 19, 1948

2,451,616

UNITED STATES PATENT OFFICE 2,451,616

AUTOMATIC STOP AND LOCK FOR MACHINES FOR GAUGING CARTRIDGES

Floyd I. Goin, Independence, Mo., assignor to Remington Arms Company, Inc., Bridgeport, Conn., a corporation of Delaware Application April 4, 1944, Serial No. 529,444

1 Claim. (Cl. 209—88)

This invention relates, in general, to automatic stop means for gauging machines, and, in particular, to auxiliary devices for automatically stopping, gauging and weighing machines.

Typical of the kinds of machines used extensively for gauging and weighing cartridges are those illustrated in the Burton patent, No. 1,652,-298, December 13, 1927, and the Candee patent, No. 1,783,404, December 2, 1930, in which cartridges to be gauged are fed into gauge chambers of a gauging dial and are indexed thereby opposite various inspection stations.

To protect these machines from malfunctioning and breakage, safety devices are provided for automatically stopping the machine in the event defective cartridges are fed into the gauge chambers. In particular, one such stop device is provided which is actuated by the cartridge feeding means when a cartridge is oversize and does not seat properly in its gauge chamber. Other means are provided for operating the aforesaid stop means whenever a cartridge is too long or when a cartridge has not been properly ejected from its gauge chamber.

Although these safety devices are satisfactory, it has been found not infrequently that a cartridge of standard dimensions which at first has been properly seated in its gauge chamber by the feed means is subsequently unseated by the retroaction of the feed means; or that operators have sometimes failed to remove an oversize cartridge from its gauge chamber despite the fact that the machine has been automatically brought to a stop due to the presence of the oversize cartridge in its gauge chamber. In either event, the head of the improperly seated cartridge will project outwardly from the face of its gauge chamber and be bent during subsequent gauging operations and may also cause the destruction of the nicely adjusted gauging elements of the machine.

It is an object of the present invention to provide auxiliary safety means for stopping a gauging machine in the event a cartridge is improperly seated in its gauge chamber. A further object is to provide a member responsive to displacement of the presser block of a gauging and weighing machine to automatically actuate means for stopping the machine. A still further object is to provide an element actuated by displacement of the presser block of a gauging and weighing machine to lock a clutch operating lever against reengagement of the clutch prior to removal of an improperly seated cartridge from its gauge chamber.

Other objects, features and advantages of the invention will be described in the following specification which is descriptive of an exemplary embodiment of the invention particularly adapted to use on a gauging and weighing machine of the type illustrated in the drawings. It will be understood, however, that the invention is not limited in its use to the specific machine shown but may have other applications and may be embodied in modifications all within the scope of the appended claim.

In the drawings:

Fig. 4 is a fragmentary plan view of the clutch operating elements of the machine.

Fig. 5 is an enlarged perspective view of a fragmentary part of the gate tripping cam.

Figure 1:
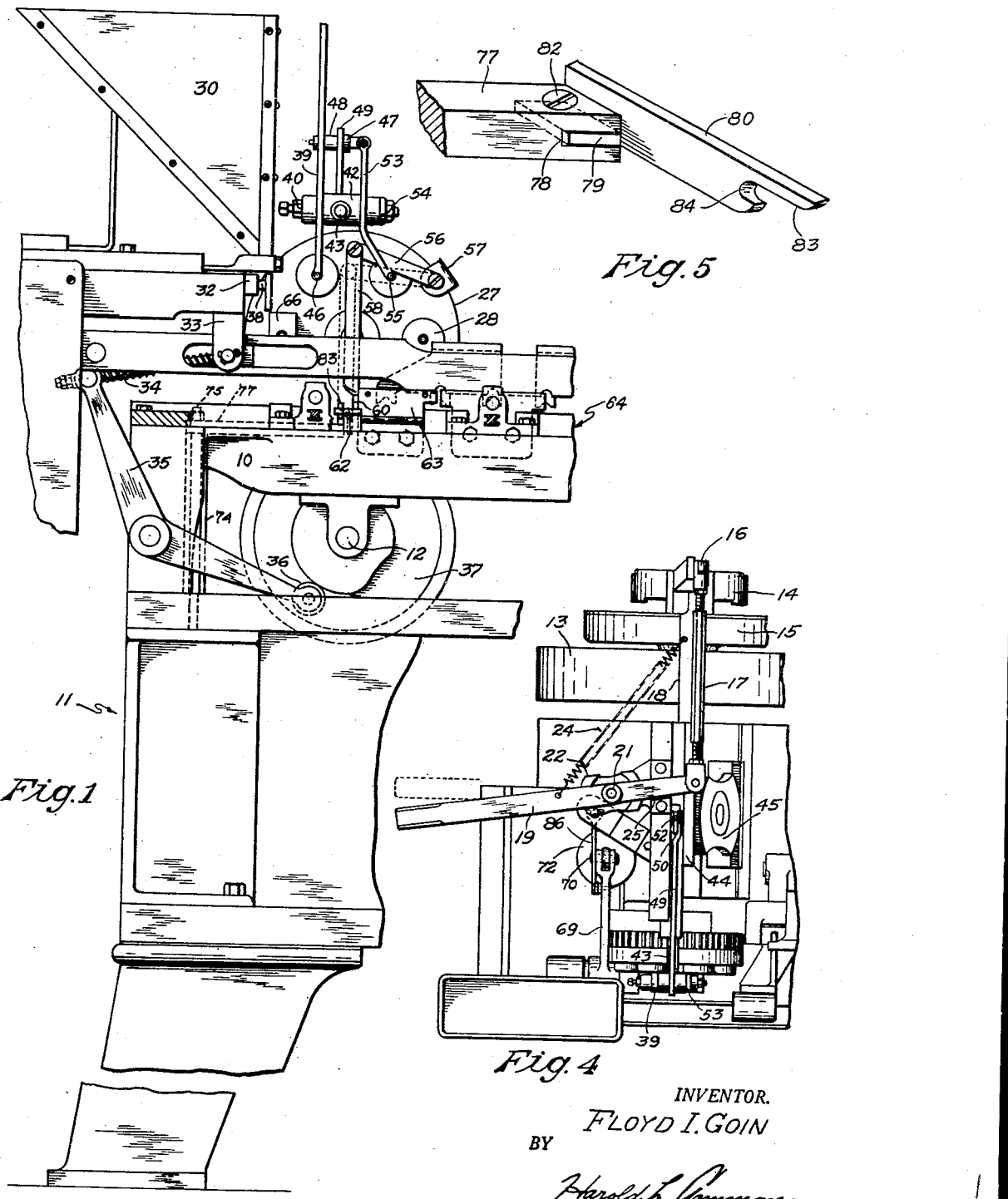
Fig. 1 is a fragmentary front elevation of a gauging and weighing machine which is a modification of the Burton machine identified above and which includes the auxiliary stop means of this invention.

The machine shown in the drawings is a cartridge gauging and weighing machine of the type illustrated and described in the Burton patent above-identified, but embodies modifications thereof which are primarily safety devices for automatically stopping the machine in the event an imperfect cartridge is retained in a chamber gauge of the gauging dial. These modifications do not go to the essential operation and function of the machine as described in the aforementioned patent, and hence the present description will embrace only as much of the machine as is necessary to a full and clear understanding of the invention.

Figure 3:
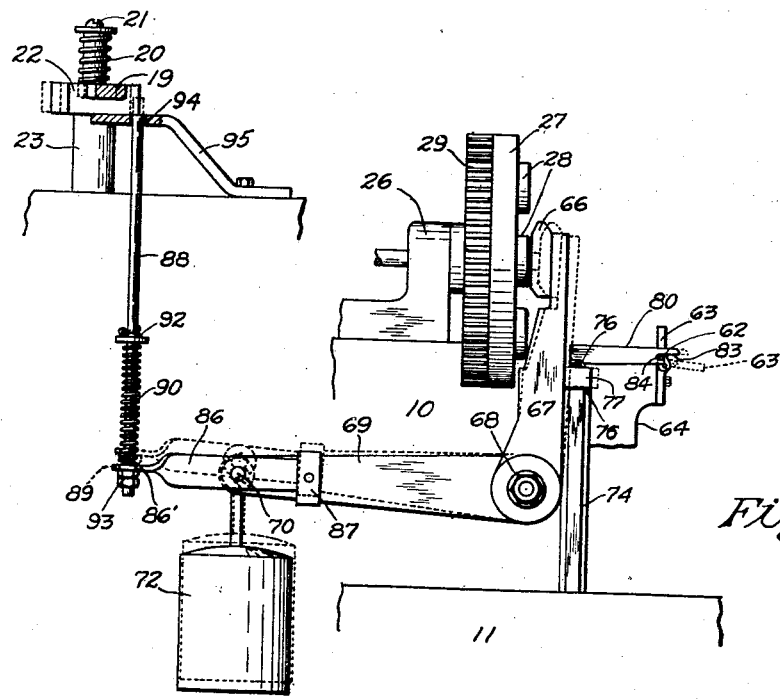
Fig. 3 is a side elevation of the machine in the direction of the arrows 3—3 of Fig. 2, including the clutch engaging arm and lock means of this invention.

In general, the gauging and weighing machine comprises a bed 10 supported on a suitable frame, indicated generally at 11, in which is rotatably mounted a driving shaft 12. The latter carries a loose pulley 13, see Fig. 4, and slidable clutch collar 14 which is adapted to be moved along the shaft to mesh with or disengage a clutch 15 on the hub of the pulley 13 and to lock or unlock the pulley to or from the shaft 12 respectively. The clutch collar 14 is moved to and from engagement with the pulley clutch 15 by suitable links 16 and 17. The former is pivoted substantially vertically intermediate its length on a fixed bracket 18; its lower end making an articulative connection with the clutch collar 14. The upper end of the lever 16 is pivotally connected to the adjacent end of the lever 17, the opposite end of which is pivotally connected to one end of a shipper handle 19. The handle 19 is secured intermediate its length and by means of a coil spring 20 and screw 21 in a cradle 22 which is pivotally supported on the upper end of a substantially vertical post 23, as shown in Fig. 3. When the shipper handle 19 is in the full line position shown in Fig. 4, the clutch collar 14 is thrust into engagement with the clutch 15 of the pulley 13 thereby transmitting rotation of the pulley to the shaft 12. When the handle is in its dotted line position, the clutch is disengaged and the machine is adapted to be immediately stopped by suitable braking means, not shown. A coil spring 24 is provided which is secured at one end to the fixed bracket 18 and at its opposite end to the shipper handle 19 to bias the latter in position to disengage the clutch. The handle is normally held in clutch engaging position by engagement of one edge of the handle with a shoulder 25 of a fixed element of the bed 10.

Rotatably supported in a substantially vertical plane on the base 10 by a suitable bearing block, indicated generally at 26, is a gauging drum 27 which in the present embodiment carries five gauging chambers 28 equally spaced circumferentially about the drum. The drum 27 is provided with peripheral gear teeth 29 which engage gear teeth of a star wheel (not shown) which is provided with radial slots adapted to be engaged successively by a stud carried on a disk secured on the driving shaft 12 as fully described in the above mentioned Burton patent. Thus, when the shaft 12 is clutched to the pulley 13 and rotated, the drum 27 is rotated step-by-step successively carrying each gauge chamber 28 opposite loading and inspection stations hereinafter described.

The cartridges are automatically fed opposite the gauge chambers of the drum 27 from a hopper such as shown at 30 by means of a reciprocating feed block 32. As shown in Fig. 1, the feed block 32 is connected by a depending arm 33 and connecting rod 34 to one end of a bell crank lever 35 which is pivoted to the frame 11 of the machine. The opposite end of the bell crank lever carries a roller 36 which is adapted to ride in the cam groove of a cam plate 37 secured on the shaft 12 and is adapted thus to impart reciprocating motion to the feed block 32 when the shaft is rotated.

The feed block 32 has a transverse trough shaped slot 38 in its forward end adapted to underlie the discharge port of the hopper 30 and to receive cartridges successively therefrom and advance them opposite the loading station of the gauging drum 27 in which position the cartridge is in registry with one of the gauge chambers 28.

Suitable means for moving a cartridge out of the trough 38 of the feed block 32 into one of the gauging chambers 28 comprises a push lever 39 which is pivotally supported intermediate its end on the trunnion 40 of a cross head 42 which in turn is secured on the end of a reciprocable rod 43. The latter is an extension of a rack member 44 slidably mounted on the base 10 at substantially right angles to the direction of movement of the feed block 32 and adapted to be engaged by teeth of a segmental gear 45 which is driven in a well known manner from the driving shaft 12.

The lower end of the push lever 39 has a contact head 46 comprising a pad made of leather or other soft material. This contact head 46 is adapted to be positioned substantially in line with the trough 38 in the feed block 32 when the latter is opposite the eleven o'clock loading station of the drum to engage a cartridge and push it into a gauge chamber 28.

Extending laterally from the upper reach of the lever 39 is a stud 47 having a bushing 48 on which is pivotally secured one end of a trip rod 49, the opposite end of which is slotted as at 50 and adapted to engage beneath a spring held release plug having a head 52. As more fully described in the above mentioned Burton patent, normally when the contact head 46 is moved inwardly by the reciprocating rod 43 to engage a cartridge in the feed block and convey it forwardly a predetermined distance into a gauging chamber of the drum, the lever arm 39 is enabled to move with the reciprocating rod 43 throughout the entire length of its stroke so long as the cartridge engaged by the contact head is of standard dimensions. Consequently, the trip rod 49 will not be moved relative to the reciprocating rod 43. However, if a cartridge is of greater than standard dimensions or embodies some defect such as a bent flange or burrs, it will not seat properly in its gauge chamber 28 but will extend or protrude outwardly therefrom and hence the contact head 46 will be stopped before the reciprocating rod 43 has moved the predetermined length of its stroke. The trip rod 49 will then move relative to the rod 43 so as to elevate the head 52 of the release plug; and as the latter moves rearwardly it is adapted to engage beneath the adjacent end of the shipper handle 19 and force it upwardly out of engagement with its shoulder 25. The released shipper handle is then swung over by its spring 24 to disengage the clutch and stop the machine.

It will be noted that it is possible for the operator to reengage the clutch by righting the lever arm 39 and that this may be done without withdrawing the defective cartridge from its gauging chamber.

Figure 2:
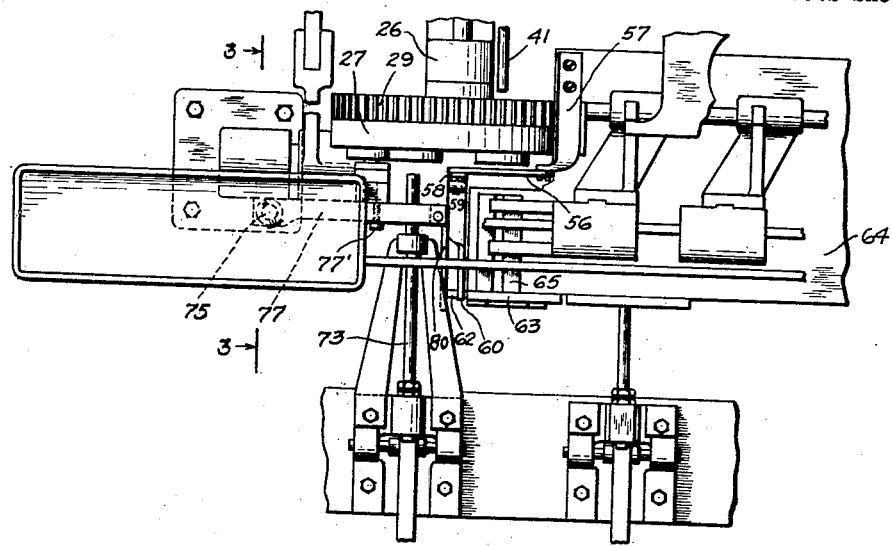
Fig. 2 is a fragmentary plan view of the machine shown in Fig. 1.

An additional safety feature comprises means for automatically stopping the machine in the event a cartridge is not removed from its gauging chamber by the ejecting punch. The latter, shown at 41 in Fig. 2, is located at the five o'clock station of the drum 27 and is adapted to move a predetermined distance into each gauge chamber as it is indexed opposite the punch to engage and eject a cartridge therefrom. However, should a cartridge be unusually short, the punch might fail to remove the cartridge from its chamber whereupon the cartridge would be indexed around to the feeding station and cause a smash-up. To prevent this, a second lever arm 53 is pivotally supported on a trunnion 54 of the cross head 42 and is suitably connected at its upper end to the laterally extending stud 47 of the lever arm 39. The lower end of the lever arm 53 is bent and provided with a contact head 55 similar to the contact head 46 of the lever 39 and adapted to be in registry with a gauge chamber 28 in the one o'clock position of the drum 27. The contact head 55 will be carried to and from its gauge chamber by the reciprocating rod 43. Normally when there is no cartridge in the one o'clock gauge chamber, the second lever arm 53 will be carried back and forth with the reciprocating rod 43 throughout the length of its stroke. However, whenever a cartridge is lodged in a gauge chamber at the one o'clock station, the contact head 55 will be stopped prematurely by engagement with the cartridge, and, as the rod 43 continues its movement relative to the head 55, the lever 53 will be pivoted on its trunnion 54 thereby actuating the trip rod 49 as described above and disengaging the clutch.

The lever arm 53 and its contact head 55 are also adapted to stop the machine in the event a cartridge of greater than standard overall length is engaged by the ejection punch at the five o'clock station of the gauging dial. To this end an arm 56 is pivoted at one end to a suitable fixed bracket 57 and at its opposite end to the upper end of a substantially vertically disposed link 58 having a foot portion 59 at its lower end, see Fig. 2, bent at substantially right angles and extending outwardly relative to the face of the drum. The forward end of the foot 59 is reduced to provide a relatively thin finger 60. The latter is adapted normally to be supported on a substantially horizontal pin 62 which extends laterally at substantially right angles to the finger 60 from the edge of a hinged plate or gate 63. The gate is located at the head end of a cartridge track, indicated generally at 64, fixed to the bed 10 of the machine. Details of the construction of the track 64 and the means for traversing cartridges along the track to various inspection stations are shown and described in detail in the aforementioned Candee patent and form no part of the present invention. The head end of the track embodies a grooved guide plate 65, the groove of which is in alignment with the center of the gate 63 and a gauge chamber 28 of the drum at the five o'clock ejection station. When an over-length cartridge is ejected from its chamber onto the grooved guide plate 65, the excessive length of the cartridge causes its head to strike sharply against the hinged plate 63. The latter is thereupon thrown open or outwardly carrying its pin 62 out from under the finger 60 of the link 58. The latter being unsupported drops down by gravity or by the force of a spring (not shown) pivoting the arm 56 downwardly into the path of movement of the contact head 55 of the lever 53. Consequently, when the latter moves inwardly, the contact head 55 strikes the arm 56 and is thereby pivoted moving the trip rod 49 relative to the reciprocating rod 43 and causing the trip rod to disengage the clutch in the manner already described.

The description thus far has been of automatic means for stopping the machine under three conditions, namely when a cartridge does not seat properly in a gauge chamber of the indexing dial; when the overall length of the cartridge is too great; or when the cartridge is too short to be ejected from its gauge chamber. These automatic stop means are features of a gauging and weighing machine of the type described in the aforementioned patents.

As mentioned above, it is possible for the operator through carelessness to reengage the clutch and start the machine without having removed an improperly seated cartridge from its gauging chamber at the eleven o'clock feeding station. Moreover, it happens not infrequently that a standard cartridge which has been properly seated in its gauge chamber will be partially withdrawn therefrom as the contact head 46 moves outwardly due to a tendency of the cartridge to stick to the relatively soft leather contact head 46. In either event, the improperly seated cartridge will be indexed adjacent a presser block 66 at the nine o'clock station of the drum while protruding outwardly from the face of its gauge chamber.

As shown in Fig. 3, the presser block 66 is carried on the upper end of an arm 67 of a bell crank lever which is pivotally supported by a threaded stud and nut, indicated generally at 68, to the bed 10 of the machine. The other arm 69 of the lever is slotted at its outer end and provided with a transverse pin 70, as indicated in Fig. 4, for supporting a weight 72. The presser block 66 is adapted normally, by means of the weight 72, to engage and press a properly seated cartridge firmly into its gauge chamber. However, if the head of a cartridge projects beyond a predetermined distance from its chamber, the cartridge head may be bent or damaged as it is forced against and beneath the presser block. Furthermore, should this condition go undetected and the defective cartridge be indexed to the seven o'clock head to shoulder inspection station, the inspection punch 73 at that station would be bent or broken when advanced into engagement with the protruding head of the cartridge.

The auxiliary stop means of this invention is adapted to automatically stop the machine whenever an improperly seated cartridge engages the presser foot 66 thereby preventing deformation of the cartridge and possible breakage of the head to shoulder inspection punch 73.

Referring to Figs. 2 and 3, mounted substantially vertically on the frame 11 is a post 74 which in the present embodiment is hexagonal in cross section and provided with screw threads at its lower end for securing the post 74 in a tapped hole in the frame 11 of the machine. The post 74 is provided with a reduced portion or trunnion 75 at its upper end and a shoulder 76 for pivotally supporting one end of an arm 77. A cotter pin or other suitable fastening means may be used to retain the arm 77 on the trunnion 75 and shoulder 76. The arm 77 is adapted to lie in a substantially horizontal plane parallel to the plane of the cartridge track 64 and normally in a vertical plane substantially parallel to the vertical plane of the indexing drum 27. Moreover, the post 74 is located so that one edge of the arm 77 is adapted to engage the rear edge of the presser block lever arm 67 as shown in Fig. 2. For the purpose of adjustment, the arm 77 may be provided with an adjusting screw 77', see Fig. 2, adapted to engage the rear edge of the lever arm 67. The opposite end of the arm 77, see Figs. 3 and 5, is bifurcated in the horizontal plane of the arm to provide a slot 78 to receive a flange 79 of a gate tripping finger or cam 80. The flange 79 is bent at substantially right angles to the reach of the finger 80 and is adapted to be pivotally secured in the slot 78 by fastening means 82. The forward end of the finger extends outwardly substantially at right angles to the arm 77 toward the hinged plate or gate 63 and is provided with a notch 83 on its underside having a shoulder 84 adapted normally to engage the pin 62 of the gate.

In operation, when an outwardly protruding cartridge is indexed against the presser block 66, the latter will be forced outwardly or to the right as seen in Fig. 3 thereby moving the arm 67 of the bell crank lever outwardly in excess of its normal movement against the restraining force of the weight 72. This excessive outward movement of the arm 67 causes the arm 77 engaged therewith to pivot clockwise about its pivot 75, see Fig. 2, thereby moving the shoulder 84 of the finger 80 forwardly against the gate pin 62 sufficiently to pivot the gate downwardly, as shown in Fig. 3. As a result, the finger 60 of the link 58 is released dropping the link 58 and arm 56 so that the contact head 55 of the lever 53 is prematurely stopped against the arm 56 to automatically effect release of the shipper handle and disengage the clutch. By the lever arrangement shown and described, it will be evident that a relatively small outward displacement of the presser block 66 in excess of its normal displacement will suffice to transmit relatively large movement to the gate operating finger 80 sufficient to throw open the gate 63.

In accordance with this construction, the machine may be brought to a stop as soon as an improperly seated cartridge engages the presser block and before the pressure of the block against the cartridge is great enough to bend or otherwise deform it. Moreover, the machine will be stopped before an improperly seated cartridge can be indexed opposite the head to shoulder gauge 73, thereby precluding any possibility of the latter being damaged.

As a further precaution against carelessness on the part of the operator, the present invention provides means for automatically checking or locking the shipper handle 19 to prevent reengagement of the clutch until the presser block 66 has been freed to assume its normal position.

Referring to Figs. 2 and 3 secured on the outer end of the bell crank lever arm 69 is a reach 86 forming an extension of the arm 69 and secured thereto by the pin 70 and a U-shaped buckle 87. The latter may be welded or otherwise secured to the side of the reach 86 and is adapted to be securely clamped over the end of the arm 69. The reach 86 has a 90° twist at its outer end to provide a horizontally disposed surface 86' for supporting a rod 88, the lower end of which is adapted to extend down through and to make a loose fit in an elongated aperture 89 in the surface 86'. The rod 88 is supported substantially vertically on the surface 86' by means of a coil spring 90 which seats on the surface 86' and engages at its upper end against a collar 92 which is held from sliding up on the rod 88 by a cotter pin or other suitable fastening means; and a pair of lock nuts 93 threaded on the lower end of the rod 88 beneath the surface 86' and adapted to secure the rod in the aperture 89.

The upper end of the rod 88 extends through a guide aperture 94 of a bracket 95 fastened to a fixed part of the bed 10. As shown in Fig. 3, the upper end of the rod 88 is adapted normally to abut the underside of the shipper handle cradle 22 adjacent the right-hand edge thereof when the latter is in clutch engaging position, as indicated by the full lines in Figs. 3 and 4.

When the presser block 66 is pivoted outwardly as indicated by its dotted line position, the bell crank arm 69 pivots clockwise thereby raising the rod supporting surface 86'. Until such time as the cradle 22 of the shipper handle 19 is moved off of the top of the rod 88, which occurs when the clutch is automatically disengaged as described above, the coil spring 90 will be compressed and exert a force on the rod 88 tending to move it upwardly.

Consequently, as soon as the cradle 22 pivots to the left, see Fig. 3, uncovering the top of the rod 88, the latter springs upwardly into the path of the adjacent edge of the cradle. The operator is thereby prevented from returning the shipper handle and cradle 22 to their normal position for reengaging the clutch until the rod 88 has been lowered and this can be readily accomplished only by withdrawing an improperly seated cartridge from its gauge chamber and enabling the presser block to return to its normal position.

What is claimed is:

In a machine for the gauging of cartridges, the combination with an indexable drum having therein a plurality of gauging chambers, means for indexing said drum comprising a clutch, means for initially positioning cartridges to be gauged in said chambers, means for finally seating said cartridges in said chambers adapted to be moved by a cartridge so deformed or so misplaced as to be incapable of seating, means for gauging the length of cartridges comprising a displaceable latch, and clutch controlling means controlled by said latch; of means controlled by the movement of said seating means for displacing said latch, and other means controlled by the movement of said seating means for locking said clutch in disengaged position.

FLOYD I. GOIN.

REFERENCES CITED

The following references are of record in the file of this patent:

UNITED STATES PATENTS

| Number | Name | Date |
| --- | --- | --- |
| 1,652,298 | Burton | Dec. 13, 1927 |
| 1,848,827 | Fink et al. | Mar. 8, 1932 |
| 2,082,882 | Garnero | June 8, 1937 |
| 2,221,481 | Jensen | Nov. 12, 1940 |
| 2,246,582 | Gantzer | June 24, 1941 |
| 2,290,103 | Hohl et al. | July 14, 1942 |
| 2,291,264 | Vergobbi | July 28, 1942 |
| 2,299,106 | Pechy | Oct. 20, 1942 |
| 2,303,507 | Sjoberg | Dec. 1, 1942 |
| 2,356,242 | House | Aug. 22, 1944 |